United States Patent
Djabarov et al.

(10) Patent No.: US 7,970,946 B1
(45) Date of Patent: Jun. 28, 2011

(54) RECORDING AND SERIALIZING EVENTS

(75) Inventors: Gueorgui N. Djabarov, Tucson, AZ (US); Yevgeniy Gutnik, Cupertino, CA (US); Omer Shakil, Mountain View, CA (US)

(73) Assignee: Google Inc., Mountain View, CA (US)

( * ) Notice: Subject to any disclaimer, the term of this patent is extended or adjusted under 35 U.S.C. 154(b) by 224 days.

(21) Appl. No.: 12/324,049

(22) Filed: Nov. 26, 2008

Related U.S. Application Data (60) Provisional application No. 60/990,595, filed on Nov. 27, 2007.

(51) Int. Cl.
*G06F 15/16* (2006.01)
*G06F 15/173* (2006.01)

(52) U.S. Cl. ......................... 709/248; 709/224

(58) Field of Classification Search .................. 709/203, 709/224, 230, 248; 713/400, 500
See application file for complete search history.

(56) References Cited

U.S. PATENT DOCUMENTS

| | | | | |
|---|---|---|---|---|
| 5,617,561 | A * | 4/1997 | Blaauw et al. | 703/26 |
| 6,975,659 | B2 * | 12/2005 | Nagano et al. | 372/36 |
| 2002/0078256 | A1 * | 6/2002 | Gehman et al. | 709/318 |
| 2004/0128528 | A1 * | 7/2004 | Poisner | 713/200 |
| 2005/0028171 | A1 * | 2/2005 | Kougiouris et al. | 719/318 |
| 2005/0094661 | A1 * | 5/2005 | Seligman et al. | 370/449 |
| 2007/0110070 | A1 * | 5/2007 | Chang et al. | 370/394 |
| 2007/0244571 | A1 * | 10/2007 | Wilson et al. | 700/11 |
| 2008/0092638 | A1 * | 4/2008 | Brenneman et al. | 73/61.41 |

* cited by examiner

*Primary Examiner* — Larry Donaghue
*Assistant Examiner* — Brian J Gillis
(74) *Attorney, Agent, or Firm* — Morgan, Lewis & Bockius LLP (57) ABSTRACT

Event information with respect to events that occur at a client is recorded. A current client real time clock (RTC) timestamp at the occurrence of each event is also recorded. Each event is assigned a unique sequence identification. Event data including the event information and the associated RTC timestamp and sequence identification information are transmitted to a server. The server reconstructs at least one of: a chronological order of the events on the client and the time when each event occurred at the client.

21 Claims, 9 Drawing Sheets

RECORDING AND SERIALIZING EVENTS

RELATED APPLICATIONS

This application claims priority to U.S. Provisional Application No. 60/990,595, entitled "Recording and Serializing Events," filed Nov. 27, 2007, which is incorporated herein by reference in its entirety.

TECHNICAL FIELD

The disclosed embodiments relate generally to data processing.

BACKGROUND

Sometimes it is required to assign time on events recorded on devices without permanent network connectivity and unreliable real time clock. Assigning accurate timestamp on events that occur in a client device that does not have a reliable real time clock (RTC) or permanent network connectivity presents unique challenges. On the one hand, the use of the client device RTC allows measuring time intervals with relative precisions, but does not help much with assigning timestamps to the events that occur. Also RTC resolution is usually not sufficient to reconstruct the chronological order of the events on the device. In addition, the RTC time can be changed by user interaction or by other events while the client device is being operated.

SUMMARY

Event information with respect to events that occur at a client is recorded. A current client real time clock (RTC) timestamp at the occurrence of each event is also recorded. Each event is assigned a unique sequence identification. Event data including the event information and the associated RTC timestamp and sequence identification information are transmitted to a server. The server reconstructs at least one of: a chronological order of the events on the client and the time when each event occurred at the client.

BRIEF DESCRIPTION OF THE DRAWINGS

The aforementioned features and advantages as well as additional features and advantages will be more clearly understood with reference to the detailed description below in conjunction with the drawings.

Like reference numerals refer to corresponding parts and operations throughout drawings.

DESCRIPTION OF EMBODIMENTS

Reference will now be made in detail to embodiments, examples of which are illustrated in the accompanying drawings. While the invention will be described in conjunction with the embodiments, it will be understood that the invention is not limited to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, and components have not been described in detail so as not to unnecessarily obscure aspects of the embodiments.

Figure 1:
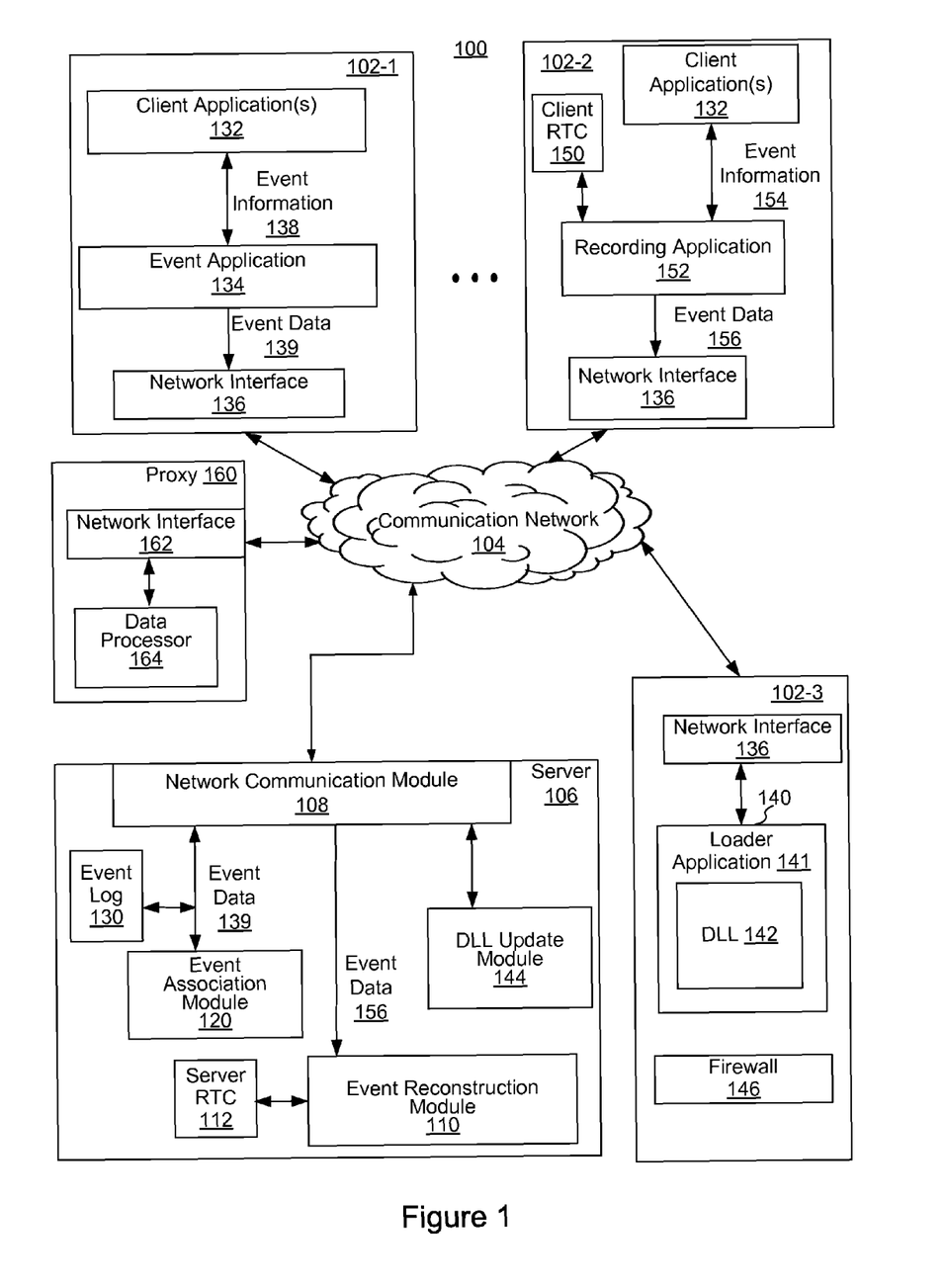
FIG. 1 is a diagram of an environment in which embodiments of the present invention may be practiced.

FIG. 1 is a diagram of an environment 100 in which embodiments of the present invention may be practiced. One or more clients, computers, or devices 102 (hereinafter "clients," such as clients 102-1, 102-2, 102-3) are connected to a communication network 104. Communication network 104 is also connected to a server 106 and a proxy 160.

Communication network 104 can be any wired or wireless local area network (LAN) and/or wide area network (WAN), such as an intranet, an extranet, or the Internet. It is sufficient that communication network 104 provides communication capability between clients 102, proxy 160 and server 106. In some embodiments, HyperText Transport Protocol (HTTP) and the Transmission Control Protocol/Internet Protocol (TCP/IP) are used to transport requests, replies, messages, data and other communications across communication network 104. The various embodiments, however, are not limited to the use of any particular protocol.

A client 102 connected to communication network 104 may be identified by an IP address. As used herein, "IP address" includes an identifier and locator of a client within the communication network, and is not limited to the use of any particular protocol. Client 102 can be any of a number of devices (e.g., a computer, an internet kiosk, a personal digital assistant, a cell phone, a gaming device, a desktop computer, or a laptop computer). Client 102 can include one or more client applications 132, 140, and/or an event application 134, and/or a recording application 152. Although client applications 132 and 140, and/or an event application 134, and/or a recording application 152 are shown in FIG. 1 as existing on three different clients (102-1, 102-2 and 102-3), in some embodiments they may exist on just two or even just one of the three clients. Alternately, a system may include one of the clients 102-1, 102-2, 102-3 and a corresponding subset of the aforementioned applications, without the others. Client 102 includes a network interface 136 to communicate with communication network 104. Client 102 is described further in reference to FIG. 5.

In some embodiments, a client application 132 can be an application that permits a user to interact with the client and/or network resources to perform one or more tasks. For example, a client application 132 can be a web browser (e.g., the computer program available under the trademark Firefox®) or other type of application (e.g., an email client, a document editor, etc.) that permits a user to search for, browse, and/or use resources, such as Web pages or other documents or sets of information. Client application(s) 132, when executed by client 102, perform operations comprising local events at the client. Examples of local events may include a user accessing a URL, a user accessing a client application 132, a user performing operations within an accessed URL or client application 132, and so on.

Event application 134 identifies event information 138 with respect to at least some of the local events at client 102, removes personal identifiable information (PII) from the event information 138 to produce event data 139, and transmits the event data to server 106 using network interface 136. In some embodiments, at least some of event data 139 is transmitted to server 106 via proxy 160, which includes data processor 164 to further process received event data before transmission to server 160. Event application 134 is described further in reference to FIG. 2. Proxy 160 is described further in reference to FIG. 2 and FIG. 7.

Client application 140 is a single application that includes a loader application 141 and an associated dynamic link library DLL 142. In some embodiments, client application 140 is an event application 134. Loader application 141 is installed on the client system 102. When loader application 141 is executed for a first time it receives a user authorization, such as one required by firewall 146, to communicate with locations external to the client 102-2. At least portions of the dynamic link library 142 are auto-updated during one or more executions of the loader application 141 without requiring additional user authorization. The loader application 141 is never or infrequently auto-updated. Client application 140 is described further in reference to FIG. 3.

Figure 4A:
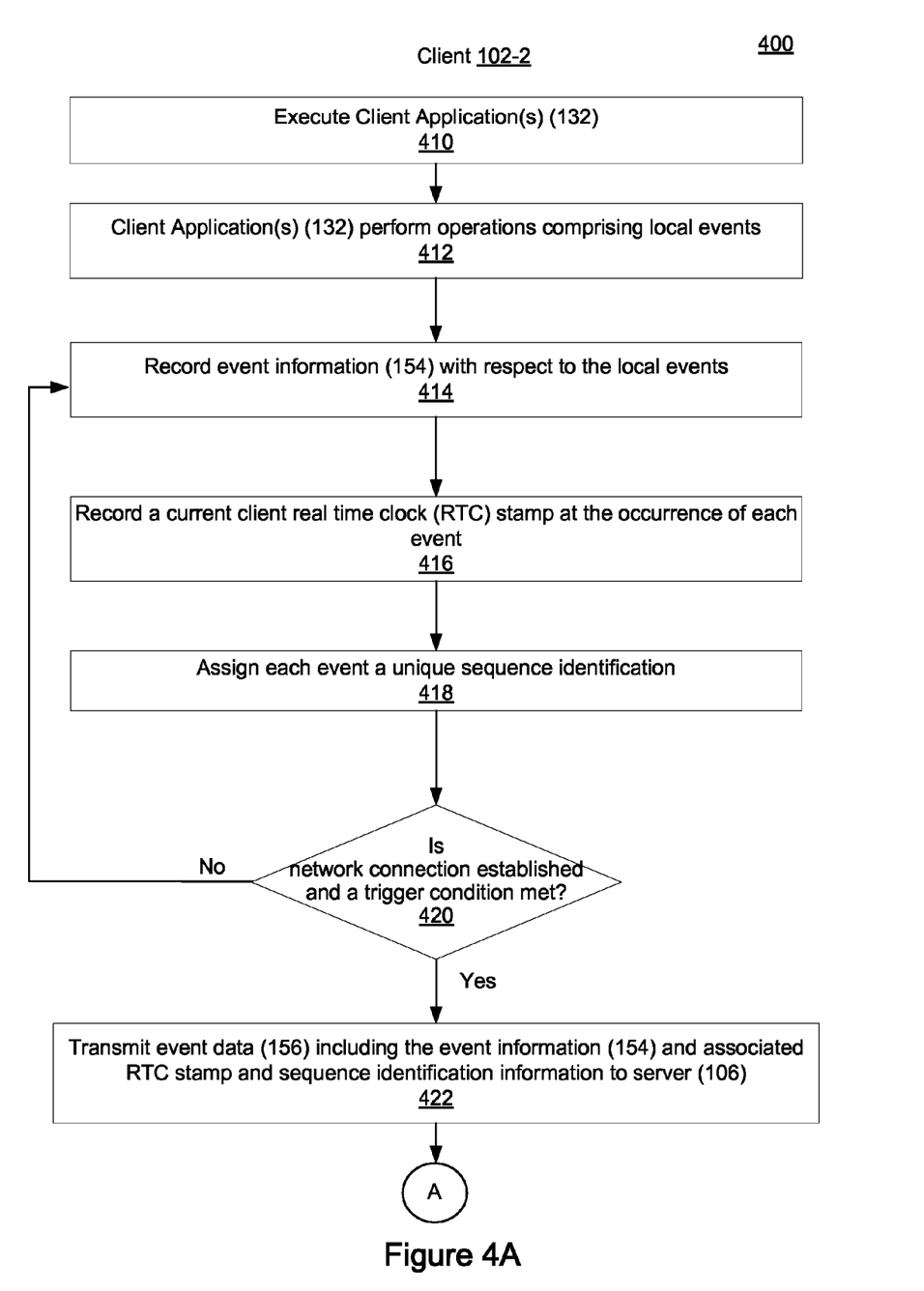
FIGS. 4A-4B are flow diagrams of a process for recording events without reliable timestamps according to some embodiments.
Figure 4B:
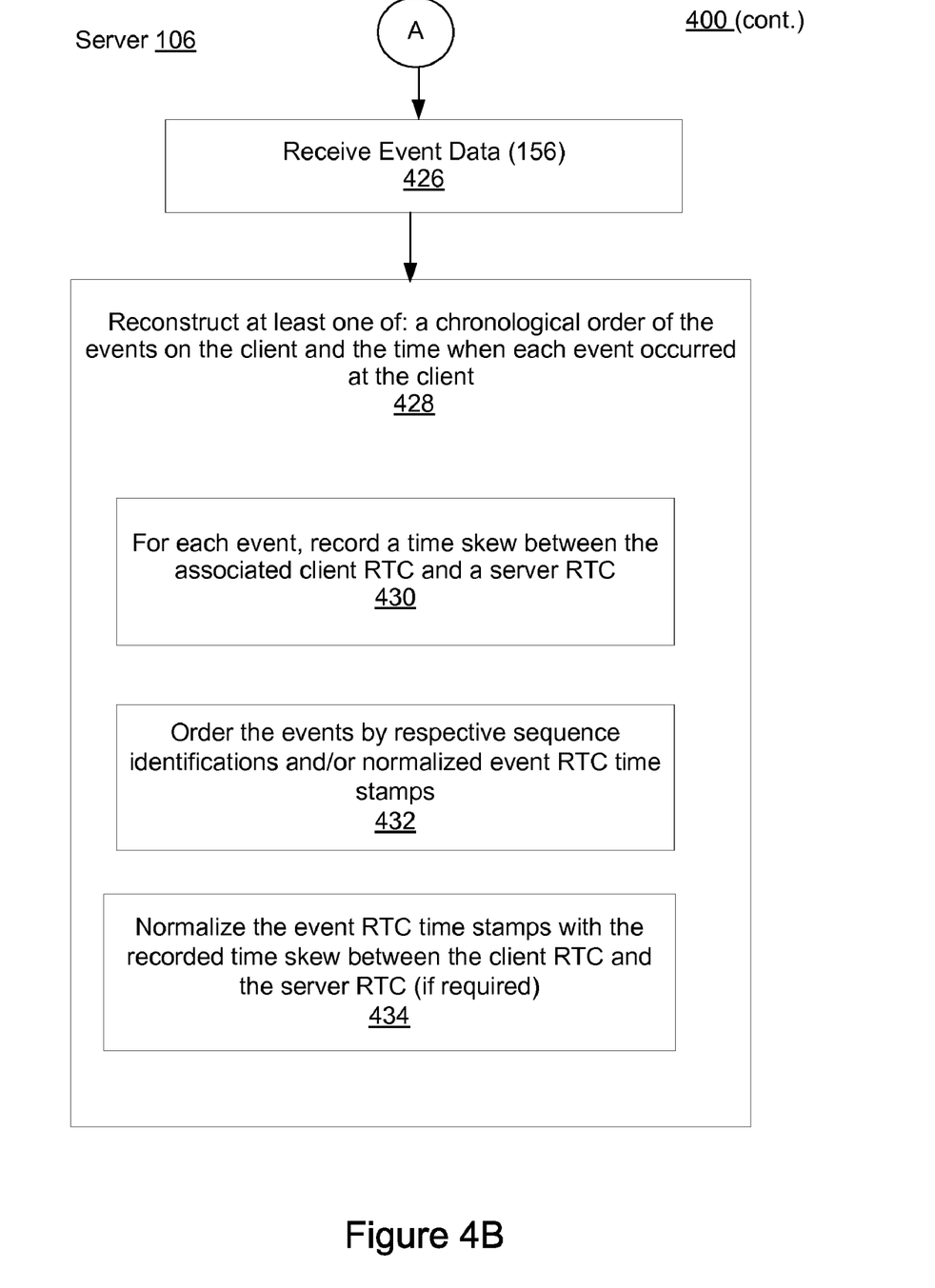

Recording application 152 records event information 154 with respect to events occurring at client 102-2, including events generated by one or more applications 132. Recording application 152 also records a current client real time clock (RTC) 150 time at the occurrence of each event and assigns a unique sequence identifier with each event to generate event data 156. Recording application 152 transmits the event data 156 to server 106 using network interface 136. Recording application 152 is described further in reference to FIG. 4. In some embodiments, recording application 152 comprises a subset of event application 134.

The server 106 can include a network communication module 108, an event reconstruction module 110, a server real-time clock (RTC) 112, an event log 130, a DLL update module 144 and an event association module 120. As used herein, the terms "module," "procedure," and "application" correspond to instructions for performing one or more functions. These instructions need not be implemented as separate software programs, procedures or modules. The various modules and sub-modules may be rearranged, separated, and/or combined. The server 106 may include additional modules and/or sub-modules, or fewer modules and/or sub-modules than indicated in FIG. 1. For example, the event log 130 may be integrated with the event association module 120. Further, various modules and sub-modules of server 106 may be distributed on one or more other servers. An embodiment of a server 106 is described further in reference to FIG. 6.

In some embodiments, network communication module 108 may be configured to handle requests from a client 102 and return resources, responses, and other information to the client 102 via communication network 104. For instance, network communication module 108 handles a request from a client 102-3 for an update (of the dynamic link library 142) to client application 140. The DLL update request may be passed by network communication module 108 to DLL update module 144 (in server 106), which provides an auto-update to the requesting client 102-3. DLL update module 144 is discussed further in reference to FIG. 3.

In some embodiments, network communication module 108 (in server 106) receives event data 139 associated with events that occur at client 102-1. Event data 139 may be received from one or both of a client 102-1 and a proxy 160. Event data 139 is data from which at least some personal identifiable information (PII) has been removed. In some embodiments, event data 139 received from client 102-1 and/or proxy 160 is stored in an event log 130. Further, event association module 120 processes the received event data 139 to find correlations and patterns among the events that occur at the same clients, and to generate statistics and perform statistical analyses, even though event data 130 has had at least some personal identifiable information (PII) removed from it. In some embodiments, event association module 120, when generating statistics from the received event data, takes into account event data known to come from the same client, even though the received data does not contain PII. For instance, the event association module 120 analyses the received event data for each client to identify particular event sequences and patterns, and then uses that information to generate statistics (e.g., frequency of occurrence across many clients, correlation with other events, etc.) concerning those particular event sequences and patterns.

In some embodiments, network communication module 108 receives event data 156 from client 102-2. Event data 156 includes: event information with respect to events that occur at client 102-2, the client real time clock (RTC) 150 time associated with each event and unique sequence identification information associated with each event. Network communication module 108 passes received event data 156 to event reconstruction module 110, which reconstructs at least one of: a chronological order of the events on the client 102-2 and the time when each event occurred at the client 102-2, based, for instance, on the server RTC 112. Event reconstruction module 110 is discussed further in reference to FIG. 4.

Also shown in FIG. 1 is a proxy 160, which in some embodiments receive event data 139 from client 102-1 and further processes event data 139 using data processor 164 before transmitting it to server 106 via network interface 162 and communication network 104.

As used herein, the terms "module," "procedure," and "application" correspond to instructions for performing one or more functions. These instructions need not be implemented as separate software programs, procedures or modules. The various modules and sub-modules may be rearranged, separated, and/or combined. The environment 100 may include additional modules and/or sub-modules, or fewer modules and/or sub-modules than indicated in FIG. 1. The modules shown in FIG. 1 as being part of environment 100 represent functions performed in an embodiment. Although FIG. 1 portrays discrete blocks, the figure is intended more as a functional description of some embodiments of the invention rather than a structural description of the functional elements. One of ordinary skill in the art will recognize that an implementation might group or split the functional elements among various components.

It should be appreciated that the layout of the server 106 is merely by way of example and may take on any other suitable layout or configuration. The actual number of computers constituting the server 106 and the allocation of features among the computers may vary from one implementation to another, and may depend in part on the amount of traffic that the server 106 handles during peak usage periods as well as during average usage periods. Moreover, one or more of the modules or components in FIG. 1 may be implemented on one or more servers designed to provide the described functionality.

Figure 2A:
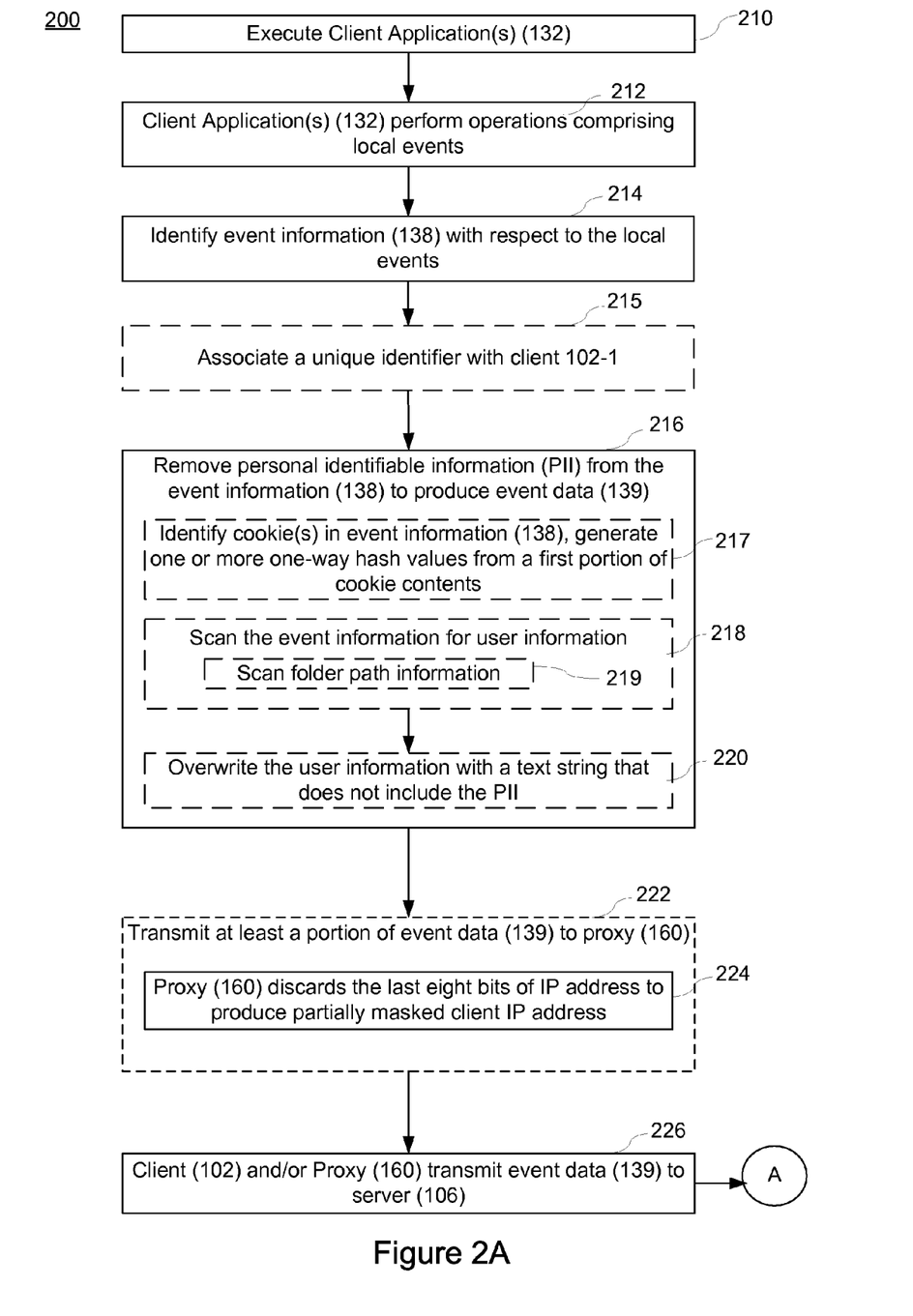
FIGS. 2A-2B are flow diagrams of a process for removing personal identifiable information from client event information according to some embodiments.
Figure 2B:
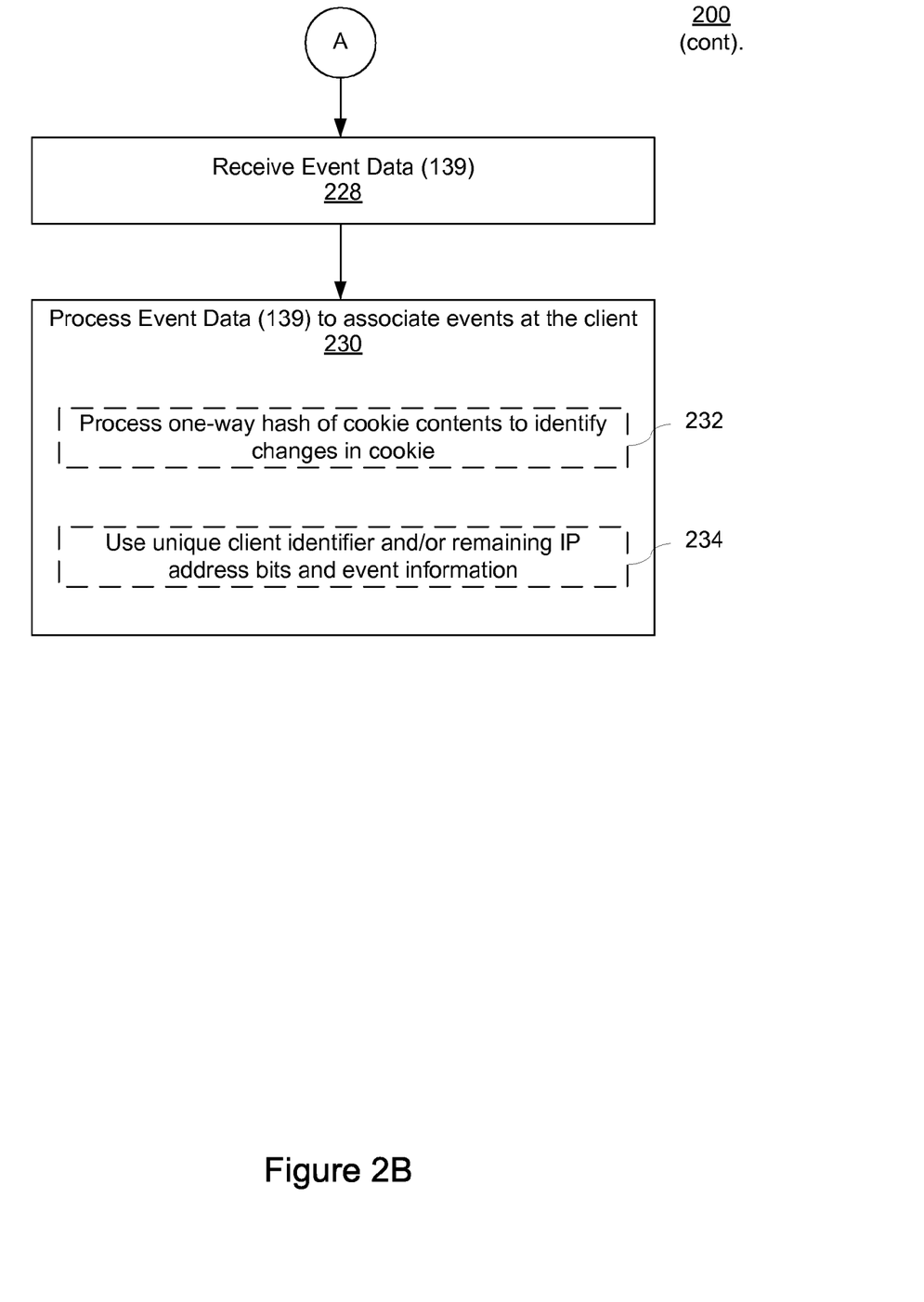

FIGS. 2A and 2B are flow diagrams of a process 200 for removing personal identifiable information from client event information according to some embodiments. FIGS. 2A and 2B illustrate both the client-side and the server-side operations involved in process 200. In some embodiments, at least some of the client-side operations are performed by event application 134. Optional operations are indicated by dashed lines (e.g., boxes with dashed-line borders).

In some embodiments, a user at client 102-1 executes one or more client applications 132 (210). As discussed, examples of client applications 132 include web browser applications, email applications and so on.

Client application(s) 132, when executed by client 102-1, perform operations comprising local events at the client 102-1 (212). Examples of local events may include a accessing a URL (e.g., in response to user activation of a link to the URL), starting execution of a client application 132, performing operations within an accessed URL or client application 132, and so on.

Event application 134 identifies event information 138 with respect to the local events at the client 102-1 (214). For instance, event application 134 identifies that the user (i.e., the client) has accessed a certain URL or closed a client application 132, or accessed (e.g., clicked on or otherwise activated) a link on a Web page, and so on.

Optionally, event application 134 associates a unique identifier with the client 102-1 (215). In some embodiments, the unique identifier is randomly or pseudo-randomly generated by the client 102-1 when the event application 134 or client application 140 is first executed after installation on the client 102-1. The unique identifier for the client is durably stored on the client 102-1 (e.g., in non-volatile memory). In one embodiment, event application 134 transmits the unique identifier with the event data to the server 106, either directly or via proxy 160 (226). In this embodiment, the unique identifier in the event data 139 can be associated by the server with a particular client, without the server knowing the identity of the client or where the client is located. In other words, all event data having the same unique identifier is known by the server 106 to have come from the same client 102-1, even though the server 106 does not know the identity of the client and does not know where the client is located.

Event application 134 removes personal identifiable information (PII) from the event information 138 to produce event data 139 (216). In some embodiments, personal identifiable information includes user information, such as user name, a user account identifier, and other user account identification information. User information can contain personal information like names and other related information. In some embodiments, event application 134 scans event information 138 to identify user information (218). For instance, event application 134 scans folder path information to identify user information (219), for example by text matching or searching name-value pairs or searching by field name. Further, in some embodiments, event application 134 removes personal identifiable information (PII) from the event information 138 by overwriting identified user information with a text string that does not include PII (220). For some events, PII may be simply deleted from the event information, while for other events the PII may be replaced with non-personal values (e.g., a fixed text string or other fixed value).

In some embodiments, for further processing of event information to further remove PII, event application 134 uses network interface 136 to transmit event data 139 to proxy 160 (222). Proxy 160 receives event data 139 via network interface 162 and uses data processor 164 to identify the client IP address in (or sent along with) event data 139 and to partially redact (e.g., partially mask or remove portions of) the client IP address (224) prior to forwarding the event data, including the partially redacted client IP address, to the server (226). The client IP address is partially redacted (by the proxy 160) by discarding the N least significant bits (e.g., the last eight bits) of the client IP address (224) that is transmitted by the client 102-1 in (or along with) the transmitted event data 139. As discussed, client 102-1 is typically associated with an IP address. The IP address may be a static, globally unique IP address that always identifies the particular client 102-1, a dynamically assigned IP address, or an IP address associated with multiple clients, such as the IP address of a proxy server. For the purposes of this document, it is equally accurate to say that the client includes IP address information "in the event data 139" that it transmits to proxy 160, or to say that such IP address information is sent (by the client) along with the transmitted event data 139.

Because IP addresses act as locator for network-connected devices, the proxy discards the last eight bits (or more generally the N least significant bits, where N is an integer greater than 0) of the client IP address to produce a partially redacted client IP address that is sent along with the event data to the server. Discarding one bit (N=1) would mean that the partially redacted IP address is associated with one of two clients. Discarding five bits (N=5) would mean that the partially redacted IP address is associated with one of 32 machines. Discarding eight bits (N=8) would mean that the partially redacted IP address is associated with one of 256 machines. Thus, in some embodiments, the last eight bits of the IP address are discarded, because with 256 potential client machines, it is much more difficult to correlate to the real machine. Thus, discarding N least significant bits of the client IP address prevents the server 106 (or any other device receiving the event data from the proxy 160) from using the IP address information received from the proxy 160 to determine the precise location or identity of the client that sent the event data 139. In this manner, server 106 receives event data 139 with a partially redacted client IP address. Some of the IP address bits of the client IP address remain intact (e.g., the first 24 bits of a 32 bit IP address), but this information is insufficient to enable the server 106 to determine the identity of the client or where specifically the client is located. On the other hand, retaining a portion of the most significant bits of the IP address of the client that transmits event data can be useful for identifying differences in application usage patterns and other differences in client or user behavior among groups of users from various regions of the world.

Event data 139 is transmitted from the client 102-1 and/or proxy 160 to server 106 (226).

Additionally, or in the alternative, event application module 134 identifies one or more cookies in the event information 138 and generates one or more one-way hash values from the cookie(s), or portions of the cookies, to produce respective hash values, and transmits the hash value(s) to the server 106, either directly or via proxy 160 (217). Depending on the context, the hash values may also be called hashed cookie values or cookie hash values. Each of the hash values corresponds to an entire cookie, a predefined field of a cookie (e.g., a user identifier field), or a predefined portion of a cookie (e.g., all of a cookie, excluding one or more predefined fields). The hash value of a cookie, a cookie field, or a cookie portion, changes whenever the cookie, cookie field or cookie portion changes in value.

Generally, cookies are not considered to be personally identifiable information, but they can nevertheless contain sensitive information. For instance, a cookie may contain a user identifier, a creation time, a last modified time, and a signature, all or some of which may be PII, or which may be used indirectly to acquire PII. In one embodiment, a cookie in the event information includes a first portion and a second portion, which are distinct and non-overlapping. The first portion includes a plurality of fields that contain either PII or information that may be considered sensitive, while the second portion of the cookie does not contain PII or sensitive information. At block 217, event application 134 generates one or more hash values based on some of the cookie contents in the first portion of the cookie. For instance, event application 134 may generate and record a one-way hash value of the user identifier field of a cookie, a one-way hash value of the creation time of the cookie and a one-way hash value of the last modified time of the cookie. These one-way hash values from the cookie, along with the second portion of the cookie are included in the event data, which is transmitted to the server. One or more fields in the first portion of the cookie, such as a signature field, may be left out of the event data that is transmitted to the server.

Further, in some embodiments, event application 134 combines a unique client identifier with one or more cookie fields when producing the hash values. As discussed above with reference to operation 215, the unique client identifier may be a randomly generated client identifier that is generated at the client by the event application when the event application is first installed or when the event application is executed for a first time. In some embodiments, the unique client identifier is fixed (i.e., remains unchanged) so as to be able to associate the cookie with a particular client, without using PII. For instance, in one embodiment the event application 134 combines (e.g., concatenates, or mathematically adds or subtracts) the unique client identifier, UID, to each the fields, or sets of fields, for which a hash value is generated. For example, if a cookie contains, in its first portion, the fields ID=87c0259ed4614876, TM=1155861835, and LM=1157564945, where the ID is a user identifier or event type identifier, TM is a cookie creation time, and LM is a cookie last modified time, two hash values produced by the event application 134 for this cookie are:

HashValue1=hash(87c0259ed4614876+{UID}),

HashValue2=hash(TM=1155861835;
LM=1157564945+{UID}), where "hash( )" represents a predefined one-way hash function, and the +operator is used to combine (e.g., concatenate) the values before and after the +operator. The two hash values in this example remain constant each time they are recomputed for the "same cookie" (e.g., the cookie for a particular URL) so long as the underlying fields remain constant in value, and they change in value when any of the underlying fields change in value. Furthermore, by combining the field values with the locally generated client identifier, the server cannot correlate cookie values in the event data from different clients.

FIG. 2B illustrates server-side operations of process 200. Server 106 receives event data 139 from the client 102-1 and/or proxy 160 (228). Network communication module 108 receives the event data 139 and passes it to event association module 120.

Event association module 120 processes event data 139 received from multiple clients and associates events received from the same client even though event data 139 has had personal identifiable information (PII) removed from it (230). As described above, the received event data 139 does not include user identifiers, because user identifiers are removed from event information 138 by the client (e.g., by the event application 134) prior to transmitting the event data 139. Further, the received event data 139 does not include the last eight bits (or more generally the N least significant bits) of the client's IP address, because the least significant bits of the client IP address are removed by a proxy 160 before the event data is forwarded by the proxy to the server 106. The received event data 139 may, however, include a unique client identifier. Because PII has been removed from the event data, the unique client identifier is randomly generated at the client, and the client IP address has been partially masked, the server 106 is unable to use the event data, the partially redacted client IP address and the unique client identifier to identify the client or even the specific location of the client from the received event data.

In some embodiments, event association module 120 processes the received event information 138 and/or the unique client identifier and/or the remaining IP address bits to determine which event is associated with which client 234, without using sensitive PII. Additionally, in some embodiments, event association module 120 may deduce other information from the received event data 139, such as demographic information, user preferences, and so on.

In some embodiments, if received event data 139 includes one or more hash values of cookie contents, event association module 120 processes the received event data to identify changes in the cookie based on changes in the hash value(s) (232). In some embodiments, event association module 120 stores the received hash values (hashed cookie values), and uses the stored hash value to compare with earlier or later received hash values from the same client (i.e., with the same unique identifier) to determine if the cookie has changed.

As illustrated in FIGS. 2A and 2B, process 200 removes both direct personal identifiable information (PII) from user data, such as user information, as well as indirect personal identifiable information (PII), such as that may be gleamed from cookie information and IP address information. Process 200 may be used to remove other types of direct or indirect personal identifiable information (PII) from user data in a similar manner.

Figure 3:
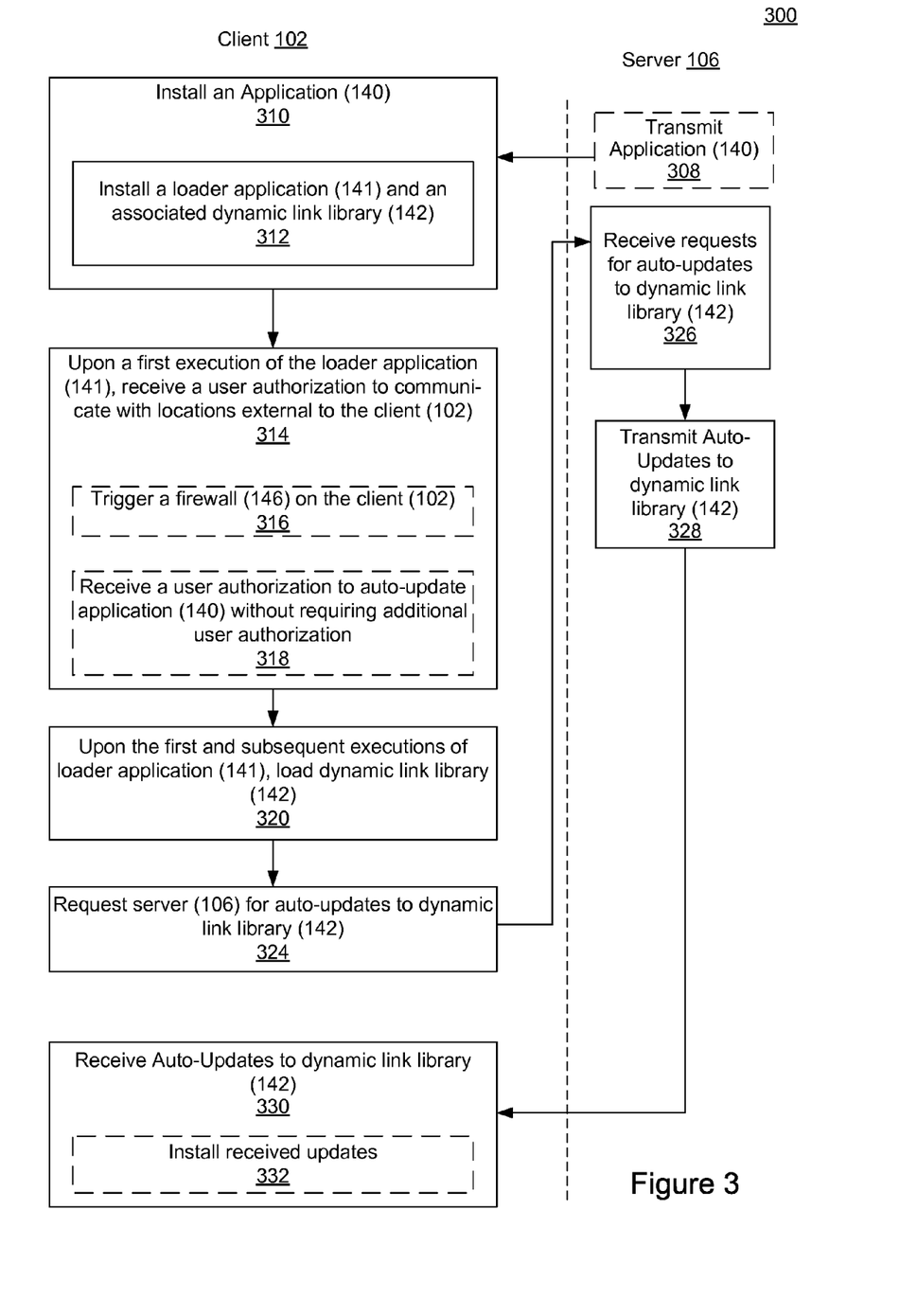
FIG. 3 is a flow diagram of a process for auto-updating an application without requiring repeated user authorization according to some embodiments.

FIG. 3 is a flow diagram of a process 300 for auto-updating an application without requiring repeated user authorization according to some embodiments. Optional operations are indicated by dashed lines.

In some embodiments, process 300 includes installing client application 140 (310). Client application 140 may be received and/or downloaded from server 106 (308). Installing client application 140 includes installing a loader application 141 and an associated dynamic link library (DLL) 142 (312). In some embodiments, loader application 141 is a relatively simple application that does not need to be updated very often, if ever. In some embodiments, loader application 141 runs in a process having an elevated privilege level (e.g., medium or high privilege level on Windows Vista®) in the client device's operating system and may be responsible for communications with the server 106, for download of updates, for upload of data and any other necessary communication between the client 102-3 and the server 106. For instance, in some embodiments, a process in which the loader application 141 executes communicates with server 106. Loader application 141 makes one or more procedure calls or function calls to programs or functions in the associated DLL 142. On the other hand, in some embodiments, DLL 142 functions as a core application that is responsible for all the functionality and features of the client application 140, including communications with the server. In some embodiments, the DLL 142 can communicate directly with the server because it is loaded in the same process as the loader application 141. Alternately, in some other embodiments, DLL 142 communicates with loader application 141 for any server communication and the DLL 142 is auto-updated by loader application 141 to provide new features, security updates, bug fixes and other changes.

In some embodiments, upon a first execution of the loader application 141, a user authorization is required to enable client application 140 to communicate with locations (e.g., server 106) external to client 102-3 (314). In some embodiments, the first execution of the loader application 141 triggers a firewall 146 on client 102-3, which asks a user to authorize communications with locations external to client 102-3 (316). Further, in some embodiments, the user authorizes communications with locations external to client 102-3 without requiring additional user authorization (318).

Upon the first and subsequent executions, the loader application 141 calls a function or procedure in the dynamic link library 142 (320). In some embodiments, the loader application 141 functions to load the dynamic link library 142 and calls a function or procedure in it. The dynamic link library 142 includes multiple functions, or procedures such as a function to request auto-updates. The dynamic link library 142 includes an auto-update function or procedure that sends requests to server 106 for auto-updates (324). In some embodiments, the dynamic link library 142 requests server 106 for auto-updates to itself periodically. For example, if the client application 140 remains loaded in the client, the dynamic link library 142 (via loader application 141) requests server 106 for auto-updates to itself each time a predefined amount of time (e.g., one day, or N days) has passed with the last auto-update request. In another example, each time the client application 140 is executed, the dynamic link library 142 (via loader application 141) sends a request to server 106 for an auto-update, unless it has already sent a request for an auto-update to the server within the predefined amount of time.

At the server side, network communication module 108 receives the request for auto-updates from the client 102-3 (326). Network communication module 108 handles a request from the client 102-3 for an update to DLL 142. The DLL update request may be passed by network communication module 108 to DLL update module 144, which provides a DLL update (if an update is available) to requesting client 102-3 (328). DLL update module 144 provides an update to DLL 142, and not to the loader application 141. The application 140 receives the auto-update, which is provided to DLL 142 during one or more executions of the loader application subsequent to the first execution of the client application 140 (330). In some embodiments, the application 140 automatically installs the received update, without requesting user authorization, thereby providing a completely automatic update of the application (332).

Optionally, the auto-update request from the client includes a current version value or other parameter specifying the current version of the application that is installed at the requesting client. This value is used by the DLL update module 144 to determine if it has an update for the requesting client, and if so, what update to send to the requesting client. In the event that the DLL update module 144 does not have any updates for the requesting client, the DLL update module 144 returns a predefined value or message to the requesting client, indicating that no updates are currently available.

Because updates of the DLL 142 do not cause the loader application 141 to be updated, the application 140 appears to the client operating system to remain unchanged. As a result, the next time the application 140 attempts to send event data to the server, or to sent an auto-update request, the original user authorization (314) for application 140 to send data to locations (e.g., servers) external to the client remains valid and in effect, and therefore no firewall warnings (or other requests for user authorization) are triggered.

FIGS. 4A and 4B are flow diagrams of a process 400 for recording events without reliable timestamps according to some embodiments. FIGS. 4A and 4B illustrate the client-side and the server-side operations respectively. In some embodiments, some of the client-side operations are performed by recording application 152 and the server-side operations are performed by event reconstruction module 110. Optional operations are indicated by dashed lines.

In some embodiments, a user at client 102-2 executes one or more client applications 132 (410). As discussed, a client application 132 can be a web browser or an email application. Client application(s) 132, when executed by client 102-1, perform operations comprising local events at the client 102-1 (412). Examples of local events may include a user accessing a URL, a user accessing a client application 132, a user performing operations within an accessed URL or client application 132, a user clicking on a toolbar button, and so on. Further examples of a local event may include user-initiated changes to the client RTC time and/or changes to the client RTC time due to other events on the client 102-2.

Recording application 152 records event information 154 with respect to the local events at the client 102-2 (414). Recording application 152 also records a current client real time clock (RTC) 150 timestamp at the occurrence of each event (416). As discussed, the client RTC 150 timestamp may not be accurate for a number of reasons. For instance, the client RTC 150 timestamp may have been manually changed or have been changed by other events on the client 102-2. Therefore, recording application 152 assigns a unique sequence identification to each event (418). The client RTC 150 timestamp is used in conjunction with the unique event sequence identification by server 106 to determine the chronological order of events at the client 102-2 or time of occurrence of the events at the client 102-2, as discussed in reference to FIG. 4B.

In some embodiments, recording application 152 assigns each successive event a monotonically increasing integer value as its unique sequence identification. In some embodiments, recording application 152 assigns each successive event two integer values as its unique sequence identification. In some embodiments, the two integer values comprise a session value and a sequence value. The session value remains constant in value between executions of recording application 152 and changes value when a new execution of the recording application 152 begins. The sequence value changes monotonically in value while the session value remains constant and successive events occur at the client 102-2. In most implementations, recording application 152 assigns sequence identifications that monotonically increase in value with successive events. Accordingly, the sequence identification value of an event that happened later in time will be greater than the value of all events that have happened before that event. However, in an implementation in which recording application 152 assigns sequence identifications that monotonically decrease in value with successive events, the sequence identification value of an event that happened later in time will be less than the value of all events that have happened before that event.

In some embodiments, recording application 152 determines if a network connection is established between the client 102-2 and the server 106 and at least one trigger condition is met (420). The trigger conditions may include: passage of a predetermined amount of time after a previous transmission of event data 156, collection of a predetermined amount of event data 156 or event information 154 at the client 102-2 and occurrence of a particular event or events at the client 102-2. For instance, a client 102-2 and/or a recording application 152 restart may constitute an event that acts as a trigger condition.

If a network connection is not established between the client 102-2 and the server 106 and/or at least one trigger condition is not met, process 400 continues at block 414. Otherwise, at block 422, recording application 152 transmits, via network interface 136, event data 156 including the event information 154 and associated client RTC stamp and sequence identification information to server 106. In some embodiments, also included in the event data 156 is the current client RTC 150 time, indicating the time of transmission of the event data from the client 102-2. In some embodiments, event data 156 is transmitted to a proxy 160 before being transmitted to server 106.

Referring to FIG. 4B, network communication module 108 at server 106 receives the event data 156 (426). The network communication module 108 passes the event data 156 to event reconstruction module 110, which reconstructs at least one of: a chronological order of the events on the client 102-2 and the time when each event occurred at the client 102-2 (428).

Event reconstruction module 110 records a time skew between the associated client RTC 150 and a server RTC 112 upon receipt of the event data at the server 106 (430). For example, upon receipt of the event data (including a recorded client RTC timestamp, indicating the time of transmission of the event data from the client 102-2), event reconstruction module 110 records a server RTC 112 time and determines a skew between the recorded client RTC 150 timestamp and the server RTC 112 time. The time skew and event data may be stored in an event log 130 (FIG. 1) associated with server 106.

In some embodiments, after the log of all events is recorded on server 106, the event reconstruction module 110 uses heuristics based on the recorded earlier data to reconstruct the chronological order of the events on the client 102-2 and the time when each event occurred on the client 102-2.

The event reconstruction module 110 uses sequence identification information associated with each event to prepare an ordering of the events (432). Event reconstruction module 110 normalizes the event (i.e., client) RTC timestamps (as provided by the client RTC 150) with the recorded time skew between the client RTC and the server RTC, if required (434). In some embodiments, if an ordering of the events by respective sequence identifications does not match a chronological order of the events based on event (i.e., client) RTC timestamps, event reconstruction module 110 normalizes the event RTC timestamps with the recorded time skew between the client RTC and the server RTC.

The timestamp normalization converts each event timestamp to be relatively accurate to the server RTC 112. Assuming that the server RTC is accurate, accurate timestamps can be assigned to the events that occurred on the device. In case the event order based on the assigned normalized timestamps does not agree with event sequence identification order, in some embodiments, the event reconstruction module 110 can apply heuristics to normalize either the timestamps or the sequence identifications depending on the expected reliability of both. Event sequence identifications usually can be implemented more reliably than the event timestamps. Another benefit of using both timestamps and sequence identifications is that events that occur within a shorter period of time than the client RTC 150 resolution can still be assigned accurate chronological order. For example if the client RTC 150 has resolution of 17 milliseconds (ms) and a few events occur within 3 ms of each other, a plurality of the event will contain the same timestamp, but each event will have unique sequence identification that reflects the correct order of occurrence.

Figure 5:
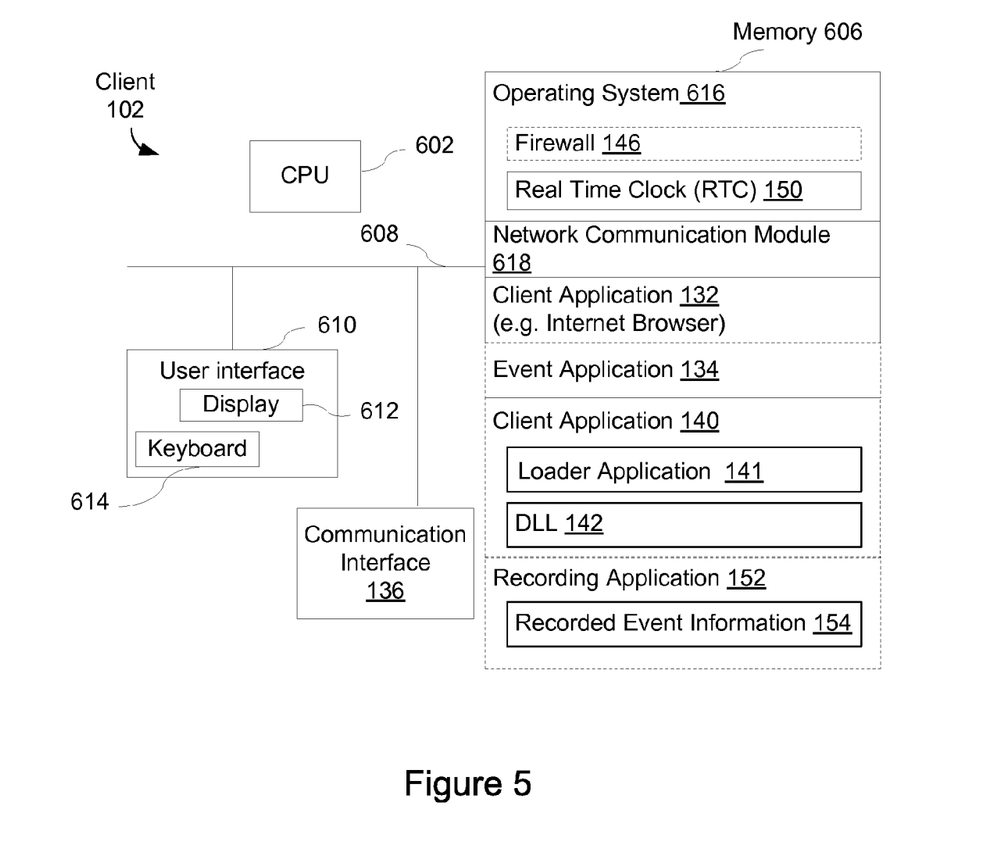
FIG. 5 is a block diagram of a client according to some embodiments.

FIG. 5 is a block diagram of a client 102 according to some embodiments. The client 102 typically includes one or more processing units (CPUs) 602, one or more network or other communications interfaces 136, memory 606, and one or more communication buses 608 for interconnecting these components. The communication buses 608 may include circuitry (sometimes called a chipset) that interconnects and controls communications between system components. The client 102 optionally may include a user interface 610, such as a display 612 and a keyboard 614. Memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 606 may optionally include one or more storage devices remotely located from the CPU(s) 602. In some embodiments, memory 606 stores the following programs, modules and data structures, or a subset thereof:

- an operating system 616 that includes procedures for handling various basic system services and for performing hardware dependent tasks;
- a firewall 146 that is either included in operating system 616, or that interoperates with operating system 616, for controlling network traffic to and from client 102 and permitting or denying communications;
- a real time clock 150 that operates as a computer clock;
- a network communication module 618 that is used for connecting the client 102 to other computers via the one or more communication network interfaces 136 and one or more communication networks 104, such as the Internet, other wide area networks, local area networks, metropolitan area networks, and the like;
- a client application 132 (e.g., a browser application) that can permit a user to interact with the client 102 as described above;
- an event application 134 for identifying event information with respect to at least some of the local events at the client and removing personal identifiable information (PII) from the event information to produce event data that is to be transmitted to a server;
- an application 140 (which may be the event application 134) that includes a loader application 141 and a dynamic link library 142, such that the dynamic link library 142 and not the loader application 141 is auto-updated without requiring user input; and
- a recording application 152 for recording event information 154 with respect to events that occur at the client, recording a current client real time clock (RTC) timestamp at the occurrence of each event, and assigning each event a unique sequence identification.

Figure 6:
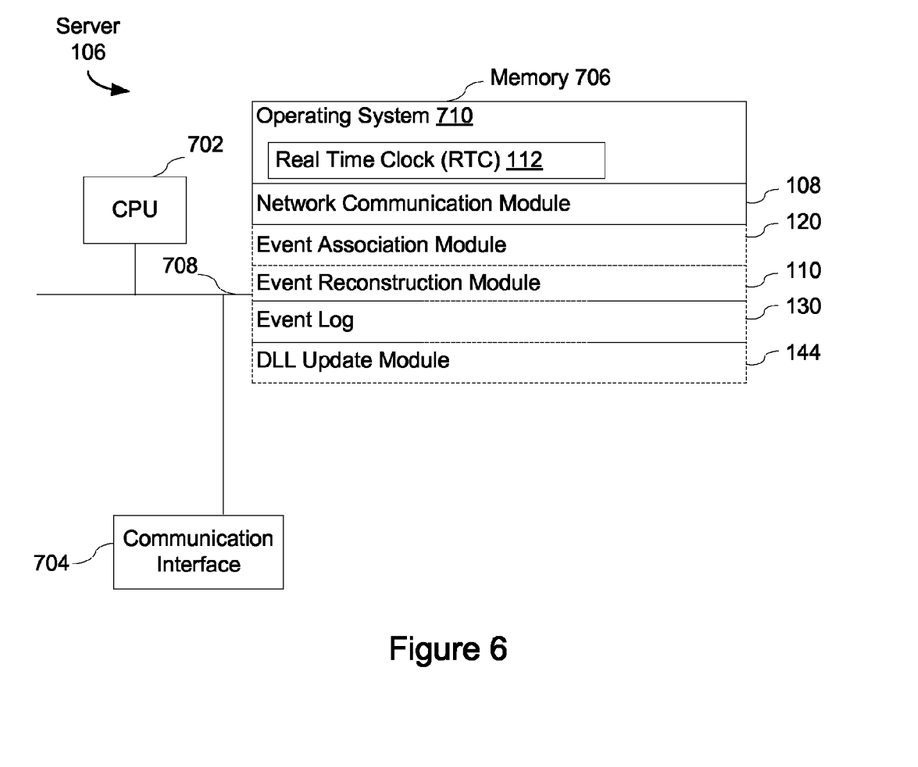
FIG. 6 is a block diagram of a server according to some embodiments.

FIG. 6 is a block diagram of server 106 according to some embodiments. Server 106 typically includes one or more processing units (CPUs) 702, one or more network or other communications interfaces 704, memory 706, and one or more communication buses 708 for interconnecting these components. The communication buses 708 may include circuitry (sometimes called a chipset) that interconnects and controls communications between system components. The server 106 may optionally include a user interface (not shown), for instance, a display and a keyboard. Memory 706 includes high-speed random access memory, such as DRAM, SRAM, DDR RAM or other random access solid state memory devices; and may also include non-volatile memory, such as one or more magnetic disk storage devices, optical disk storage devices, flash memory devices, or the like. Memory 706 may include mass storage that is remotely located from the CPUs 702. In some embodiments, memory 706 stores the following programs, modules and data structures, or a subset or superset thereof:

an operating system 710 that includes procedures for handling various basic system services and for performing hardware dependent tasks;
a real time clock 150 that operates as a computer clock;
a network communication module 108 that is used for connecting the server 106 to other servers or computers (such as clients) via one or more communications interfaces and one or more communication networks 104 (wired or wireless), such as the Internet, other wide area networks, local area networks, metropolitan area networks, and so on;
an event association module 120 that receives event data 139 associated with events that occur at one or more clients, and processes the received event data from which personal identifiable information has been removed; the event data may be processed to identify correlations and patterns among the events that occur at the same clients, and to generate statistics and perform statistical analyses of the event data;
an event log 130 that is used to store received event data 139 associated with events that have occurred at one or more clients;
a DLL update module 144 that provides a DLL update (or DLL updates) to one or more requesting clients; and
an event reconstruction module 110 that, based on event data 156 received from a client and/or server real time clock 112, reconstructs at least one of: a chronological order of the events on the client and the time when each event occurred at the client.

Figure 7:
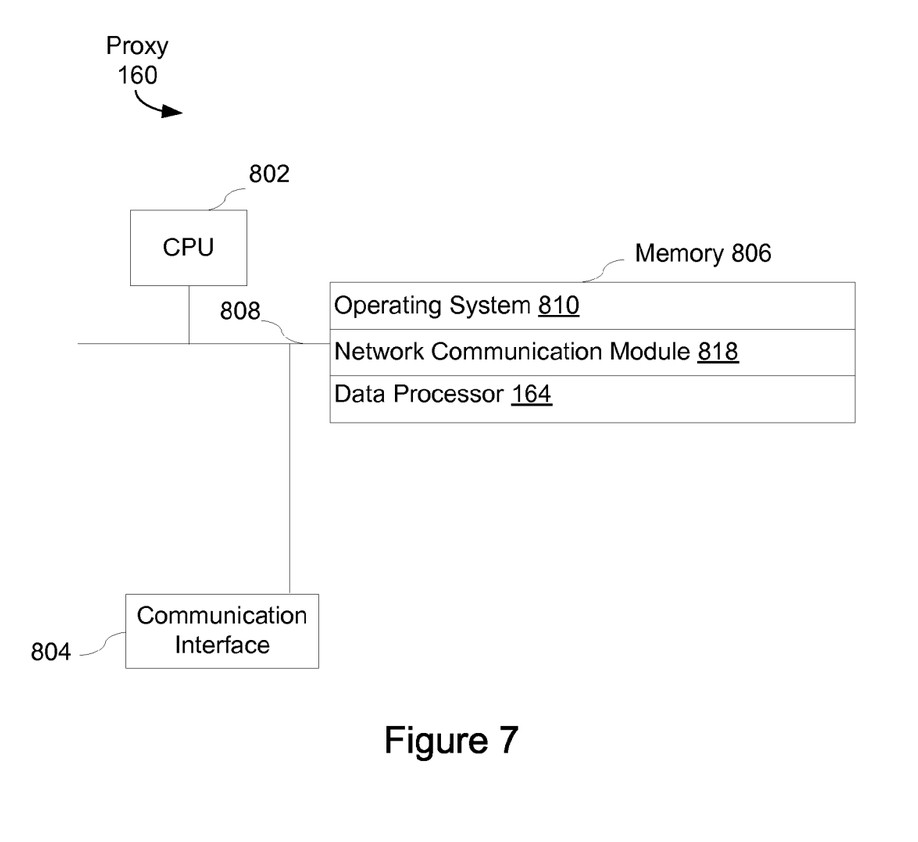
FIG. 7 is a block diagram of a proxy according to some embodiments.

FIG. 7 is a block diagram of a proxy 160 according to some embodiments. Proxy 160 typically includes one or more processing units (CPUs) 802, one or more network or other communications interfaces 804, memory 806, and one or more communication buses 808 for interconnecting these components. The communication buses 808 may include circuitry (sometimes called a chipset) that interconnects and controls communications between system components. Memory 806 includes high-speed random access memory, such as DRAM, SRAM, DDR RAM or other random access solid state memory devices; and may also include non-volatile memory, such as one or more magnetic disk storage devices, optical disk storage devices, flash memory devices, or the like. Memory 806 may include mass storage that is remotely located from the CPUs 802. In some embodiments, memory 806 stores the following programs, modules and data structures, or a subset or superset thereof:

an operating system 810 that includes procedures for handling various basic system services and for performing hardware dependent tasks;
a network communication module 818 that is used for connecting the proxy 160 to other proxies, servers or computers (such as clients) via one or more communications interfaces 804 and one or more communication networks 104 (wired or wireless) such as the Internet, other wide area networks, local area networks, metropolitan area networks, and so on; and
a data processor (e.g., an application) 164 that removes personal identifiable information (PII) in (or sent along with) event data 139 or 156 received from a client; one embodiment of as described above detail with reference to operations 222 and 224 of FIG. 2.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
at a server system,
receiving, from a client, comprising a client device or system distinct from the server system, event data including: event information with respect to events that occur at the client, client real time clock (RTC) timestamps associated with each event and unique sequence identification information associated with each event;
reconstructing at least one of: a chronological order of the events on the client and the time when each event occurred at the client, wherein reconstructing comprises for a respective event, recording a time skew between the associated client RTC and a server RTC upon receipt of the event data at the server system and ordering the events by respective sequence identifications;
determining whether an ordering of the events by respective sequence identifications does not match a chronological order of the events based on client RTC timestamps; and
in accordance with a determination that the ordering of the events by respective sequence identifications does not match the chronological order of the events based on client RTC timestamps, normalizing the client RTC timestamps with the recorded time skew between the client RTC and the server RTC.

2. The method of claim 1, wherein the event data includes event information with respect to an event at the client comprising a user-initiated change to the client RTC time.

3. The method of claim 1, wherein the unique sequence identification information for a plurality of successive events at the client includes monotonically increasing integer values.

4. The method of claim 1, wherein the unique sequence identification information for a respective event at the client includes two integer values, including a session value, which remains constant in value between executions of a client application at the client and which changes value when a new execution of the client application begins, and a sequence value, which changes monotonically in value while the session value remains constant and successive events occur at the client.

5. A method comprising:
at a client, comprising a client device or system distinct from a server system,
recording event information with respect to events that occur at the client;
recording a current client real time clock (RTC) timestamp at the occurrence of each event;
assigning each event a unique sequence identification; and transmitting event data, including the event information and associated RTC timestamp and sequence identification information to the server system, when a network connection is established between the client and the server system and any of a plurality of trigger conditions is met, the plurality of trigger conditions including: collection of a predetermined amount of event data at the client and occurrence of a particular event or events at the client;

at the server system, reconstructing at least one of: a chronological order of the events on the client and the time when each event occurred at the client; wherein reconstructing comprises for a respective event, recording a time skew between the associated client RTC and a server RTC upon receipt of the event data at the server system and ordering the events by respective sequence identifications;

determining whether an ordering of the events by respective sequence identifications does not match a chronological order of the events based on client RTC timestamps; and in accordance with a determination that the ordering of the events by respective sequence identifications does not match the chronological order of the events based on client RTC timestamps, normalizing the client RTC timestamps with the recorded time skew between the client RTC and the server RTC.

6. The method of claim 5, further comprising:

at the client, assigning each successive event a monotonically increasing integer value as its unique sequence identification.

7. The method of claim 5, further comprising:

at the client, assigning each successive event two integer values as its unique sequence identification.

8. The method of claim 7, wherein the two integer values comprise a session value, which remains constant in value between executions of a client application and which changes value when a new execution of the client application begins, and a sequence value, which changes monotonically in value while the session value remains constant and successive events occur at the client.

9. A method comprising:

at a client, comprising a client device or system distinct from a server system, recording event information with respect to events that occur at the client;

recording a current client real time clock (RTC) timestamp at the occurrence of each event;

assigning each event a unique sequence identification; and transmitting event data including the event information and associated RTC timestamp and sequence identification information to the server system;

at the server system, reconstructing at least one of: a chronological order of the events on the client and the time when each event occurred at the client; wherein reconstructing comprises for a respective event, recording a time skew between the associated client RTC and a server RTC upon receipt of the event data at the server system and ordering the events by respective sequence identifications;

determining whether an ordering of the events by respective sequence identifications does not match a chronological order of the events based on client RTC timestamps; and in accordance with a determination that the ordering of the events by respective sequence identifications does not match the chronological order of the events based on client RTC timestamps, normalizing the client RTC timestamps with the recorded time skew between the client RTC and the server RTC.

10. The method of claim 9, further comprising:

at the client, transmitting the event data if a network connection is established between the client and the server system and any of a plurality of trigger conditions is met, the plurality of trigger conditions including: passage of a predetermined amount of time after a previous transmission of event data, collection of a predetermined amount of event data at the client and occurrence of a particular event or events at the client.

11. The method of claim 9, further comprising:

at the client, assigning each successive event a monotonically increasing integer value as its unique sequence identification.

12. The method of claim 9, further comprising:

at the client, assigning each successive event two integer values as its unique sequence identification.

13. The method of claim 12, wherein the two integer values comprise a session value, which remains constant in value between executions of a client application and which changes value when a new execution of the client application begins, and a sequence value, which changes monotonically in value while the session value remains constant and successive events occur at the client.

14. A server system comprising:

one or more processors;

memory storing one or more programs having instructions to be executed by the one or more processors; and a communication interface to receive, from a client, comprising a client device or system distinct from the server system, event data including: event information with respect to events that occur at the client, client real time clock (RTC) timestamps associated with each event and unique sequence identification information associated with each event;

the one or more programs stored in memory including:

a reconstruction module to reconstruct at least one of: a chronological order of the events on the client and the time when each event occurred at the client, wherein reconstructing comprises, for a respective event, recording a time skew between the associated client RTC and a server RTC upon receipt of the event data at the server system and ordering the events by respective sequence identifications; and a normalization module to conditionally normalize the client RTC timestamps with the recorded time skew between the client RTC and the server RTC in accordance with a determination that an ordering of the events by respective sequence identifications does not match a chronological order of the events based on client RTC timestamps.

15. The server system of claim 14, wherein the event data includes event information with respect to an event at the client comprising a user-initiated change to the client RTC time.

16. The server system of claim 14, wherein the unique sequence identification information for a plurality of successive events at the client includes monotonically increasing integer values.

17. The server system of claim 14, wherein the unique sequence identification information for a respective event at the client includes two integer values, including a session value, which remains constant in value between executions of a client application at the client and which changes value when a new execution of the client application begins, and a sequence value, which changes monotonically in value while the session value remains constant and successive events occur at the client.

18. A non-transitory computer readable storage medium storing one or more programs for execution by one or more processors of a server system, the one or more programs comprising:
 a communication module to receive, from a client, comprising a client device or system distinct from the server system, event data including: event information with respect to events that occur at the client, client real time clock (RTC) timestamps associated with each event and unique sequence identification information associated with each event;
 a reconstruction module to reconstruct at least one of: a chronological order of the events on the client and the time when each event occurred at the client, wherein reconstructing comprises, for a respective event, recording a time skew between the associated client RTC and a server RTC upon receipt of the event data at the server system and ordering the events by respective sequence identifications; and
 a normalization module to conditionally normalize the client RTC timestamps with the recorded time skew between the client RTC and the server RTC in accordance with a determination that an ordering of the events by respective sequence identifications does not match a chronological order of the events based on client RTC timestamps.

19. The computer readable storage medium of claim 18, wherein the event data includes event information with respect to an event at the client comprising a user-initiated change to the client RTC time.

20. The computer readable storage medium of claim 18, wherein the unique sequence identification information for a plurality of successive events at the client includes monotonically increasing integer values.

21. The computer readable storage medium of claim 18, wherein the unique sequence identification information for a respective event at the client includes two integer values, including a session value, which remains constant in value between executions of a client application at the client and which changes value when a new execution of the client application begins, and a sequence value, which changes monotonically in value while the session value remains constant and successive events occur at the client.

* * * * *